US012022585B1

(12) United States Patent
Chen et al.

(10) Patent No.: US 12,022,585 B1
(45) Date of Patent: Jun. 25, 2024

(54) DYNAMIC PWM FREQUENCY CONTROL

(71) Applicant: ABL IP Holding, LLC, Conyers, GA (US)

(72) Inventors: Feng Chen, Hoffman Estates, IL (US); Towfiq Chowdhury, Lake Forest, IL (US)

(73) Assignee: ABL IP HOLDING, LLC, Conyers, GA (US)

( * ) Notice: Subject to any disclaimer, the term of this patent is extended or adjusted under 35 U.S.C. 154(b) by 0 days.

(21) Appl. No.: 18/093,151

(22) Filed: Jan. 4, 2023

(51) Int. Cl.
*H05B 45/325* (2020.01)

(52) U.S. Cl.
CPC .................................. *H05B 45/325* (2020.01)

(58) Field of Classification Search
CPC ...... H05B 45/30; H05B 45/305; H05B 45/32; H05B 45/325; H05B 47/10
See application file for complete search history.

(56) References Cited

U.S. PATENT DOCUMENTS

2011/0193648 A1* 8/2011 Zhao .................. H05B 45/3725
332/109

FOREIGN PATENT DOCUMENTS

DE 102016107578 A1 * 10/2017 ............. H05B 45/10

* cited by examiner

*Primary Examiner* — Jimmy T Vu
(74) *Attorney, Agent, or Firm* — Grossman, Tucker, Perreault & Pfleger, PLLC

(57) ABSTRACT

The present disclosure provides a dynamic pulse width modulation (PWM) system that includes current frequency determination circuitry to determine a DC value of a source current, and to determine a frequency of the source current generate a plurality of pulses from an AC power source; and PWM generation circuitry to generate a first PWM signal having a first frequency based on the DC value of the current source; the PWM circuitry also to generate a second PWM signal having a second frequency based on the frequency of the current source; wherein the first frequency is less than the second frequency.

20 Claims, 5 Drawing Sheets

DYNAMIC PWM FREQUENCY CONTROL

TECHNICAL FIELD

The present disclosure relates to dynamic pulse width modulation (PWM) frequency control.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
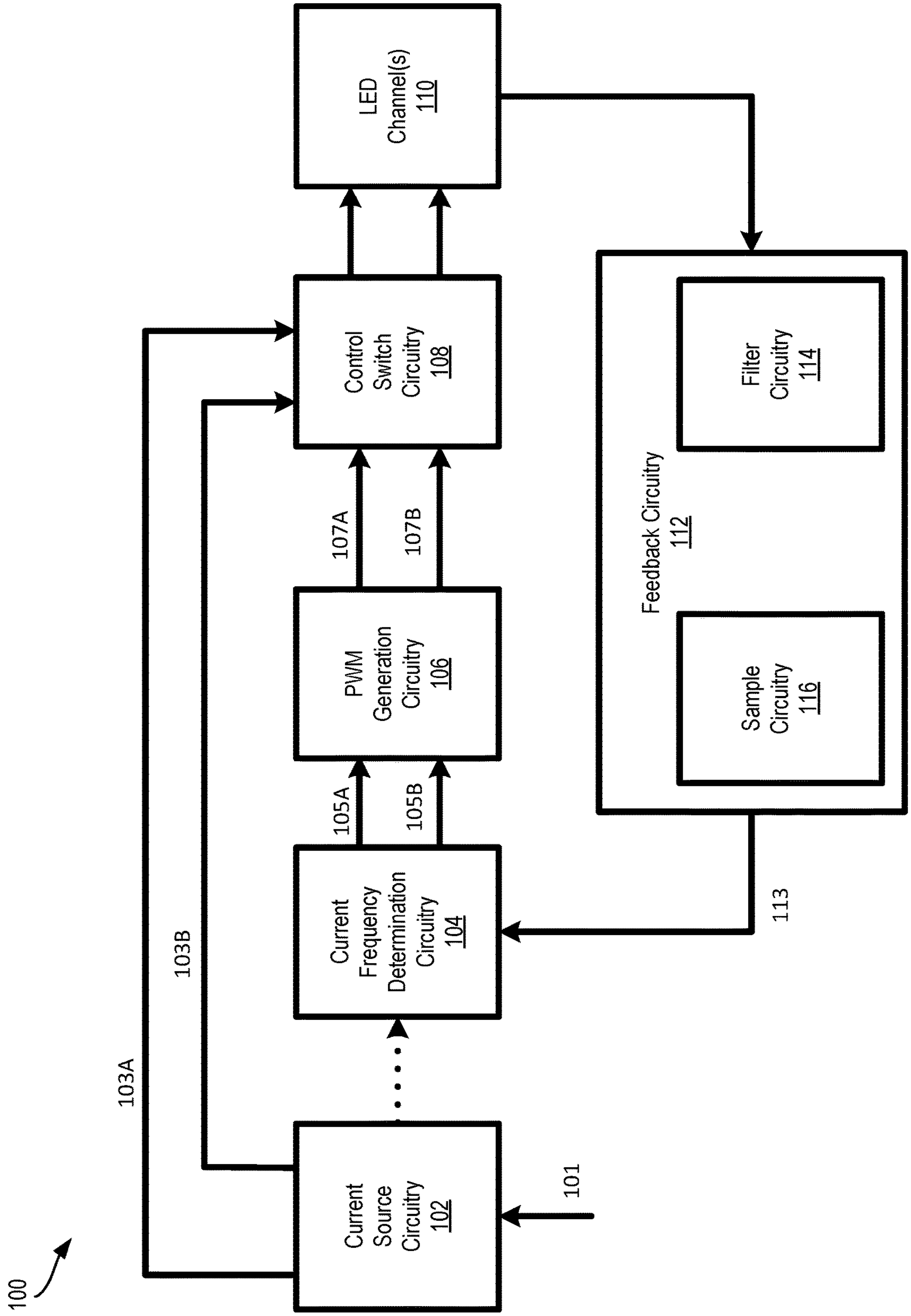
FIG. 1 illustrates a dynamic frequency control system according to several embodiments of the present disclosure.

FIG. 1 illustrates a dynamic frequency control system 100 according to several embodiments of the present disclosure. The system 100 includes current source circuitry 102 generally configured to generate current 103 to drive a plurality of light emitting diodes (LEDs). As will be described herein, the current source circuitry 102 may generate a DC current 103A and/or a PWM (variable) current 103B. In some embodiments, the PWM current 103B may include a "hybrid" (DC biased) current, and/or other waveform types that may be used for LED operations, for example, notch waveforms, irregular waveforms, etc. The current source circuitry 102 may generate current 103A and/or current 103B based on for example, an operating mode input 101. The operating mode input 101 may specify, for example, full power operating mode in which the DC current 103A may be generated and/or a dimming operating mode (or reduced power operating mode) in which the PWM current 103B may be generated.

The system also includes one or more control switch circuitry 108 generally configured to control the DC current 103A and/or 103B to deliver power to one or more LED channel(s) 110. The control switch circuitry 108 may include, for example, one or more power switches (e.g., field effect transistor, bipolar junction transistor, etc.) to control power to one or more LED channel(s) 110. An "LED channel", as used herein, may be formed by one or more LED lighting devices (for example, one or more LED lighting devices coupled in series and/or parallel with respect to the current 103A and/or 103B).

The system 100 also includes feedback circuitry 112 coupled to the LED channel(s) 110 and generally configured to determine the state of the current 103A and/or 103B, e.g., the feedback circuitry 112 is generally configured to determine if the current delivered to the one or more LED channel(s) 110 is a DC current 103A or a variable (PWM) current 103B. In some embodiments, the feedback circuitry 112 may include filter circuitry 114 generally configured to filter high frequency noise components of the current 103A and/or 103B. In some embodiments, the feedback circuitry 112 may also include sample circuitry 116 generally configured to sample feedback current to determine the state of the current 103A/103B. In such embodiments, the sample circuitry may include analog-to-digital (A/D) circuitry to generate digital signals representative of the feedback current (and such A/D circuitry may be configured to generate digital signals having a selected bit depth), and where a sampling rate of the A/D circuitry may be selected to be well above an anticipated and/or expected frequency of the feedback signal (e.g., to avoid aliasing, etc.). In embodiments, the sampling circuitry 116 may be configured to sample the current 103A/103B for a sufficient period of time to enable an accurate measurement of whether the current 103A/103B is the DC current 103A or the PWM current 103B. For example, the sampling circuitry 116 may be configured to sample current so that, at a minimum, several cycles of the PWM current 103B are sampled. This may enable a more accurate measurement of the frequency of the PWM current 103B, and may generate a series of low and high measurements reflective of a PWM signal. The feedback circuitry 112 may generate a feedback signal 113 indicative of, or proportional to, the state of the current 103A/103B. For example, if the current delivered to the one or more LED channel(s) 110 is a DC current 103A, the feedback signal 113 may include a value indicative of, or proportional to, the amplitude of DC current 103A delivered to the one or more LED channel(s) 110 is a DC current 103A. If the current delivered to the one or more LED channel(s) 110 is a PWM current 103B, the feedback signal 113 may include a variable value (e.g., series of low and high values) indicative of, or proportional to, the frequency of the PWM current 103B, and may also include any DC offset value in the PWM current 103B is a "hybrid" PWM current (e.g., a PWM current that includes an offset DC value).

The system 100 also includes PWM frequency determination circuitry 104 generally configured to receive the feedback signal 113 and determine characteristics of the source current 103A/103B. For example, in some embodiments the PWM frequency determination circuitry 104 is configured to determine whether the current 103 is the DC current 103A or the PWM current 103B. In addition, based on the feedback signal 113, the PWM frequency determination circuitry 104 is also configured to determine a frequency of the PWM current 103B. In operation, for example, The PWM frequency determination circuitry 104 is also configured to generate a first control signal 105A that is indicative of, or proportional to, a DC current 103A and a second control signal 105B that is indicative of, or proportional to a frequency of PWM current 103B (and may also include any DC offset information).

The system 100 also includes PWM generation circuitry 106 generally configured to generate a first PWM signal 107A having a frequency based on the first control signal 105A, or a second PWM signal 107B having a frequency based on the second control signal 105B. In embodiments of the present disclosure, if the current providing power to the LED channel(s) 110 is the DC current 103A, the PWM generation circuitry 106 is configured to generate a first PWM signal 107A having a duty cycle of, for example, 0-100% and having a frequency, for example, 10-100 kHz. If the current providing power to the LED channel(s) 110 is the DC current 103A, the PWM generation circuitry 106 is configured to generate a second PWM signal 107B having a duty cycle of, for example, 0-100% and having a frequency, for example, 10-100 k Hz. As a general matter, the frequency of the first PWM signal 107A is less than the frequency of the second PWM signal 107B The system 100 also includes one or more control switch(es) 108 generally configured to control power delivered to one or more LED channel(s) based on the first 107A or second 107B. In example embodiments, the frequency of the second PWM signal 107B is selected to be greater than the PWM frequency of the PWM current 103B. For example, the frequency of the second PWM signal 107B may be selected to be a whole number multiple (e.g., 2×, 4×, etc.) of the PWM frequency of the PWM current 103B. Of course, in other embodiments, the frequency of the second PWM signal 107B may be selected to be any multiple (e.g., 1.6×, 4.7×, etc.) of the PWM frequency of the PWM current 103B. The PWM signals 107A/107B may be supplied to the control switch(es) 108 to controllable deliver power to the LED channel(s) 110.

By dynamically adjusting the PWM frequency, as described herein, the teachings of the present disclosure can provide significant improvements over conventional LED driving systems, for example, improved accuracy of a target output current, reduction/elimination of perceived flicker, stability of a waveform/circuit operation, improved control of chromaticity (color shift), etc.

In some embodiments, the current source circuitry 102 may generate known values for the DC current 103A and the PWM current 103B. In such embodiments, the current source circuitry 102 may be configured to output signals indicative of the state of the current 103A and/or 103B, which may include amplitude and/or frequency information of the generated current. In such embodiments, the current frequency determination circuitry may receive such output signals and generate the output signals 105A and/or 105B directly from information received from the current source circuitry 102.

Figure 2A:
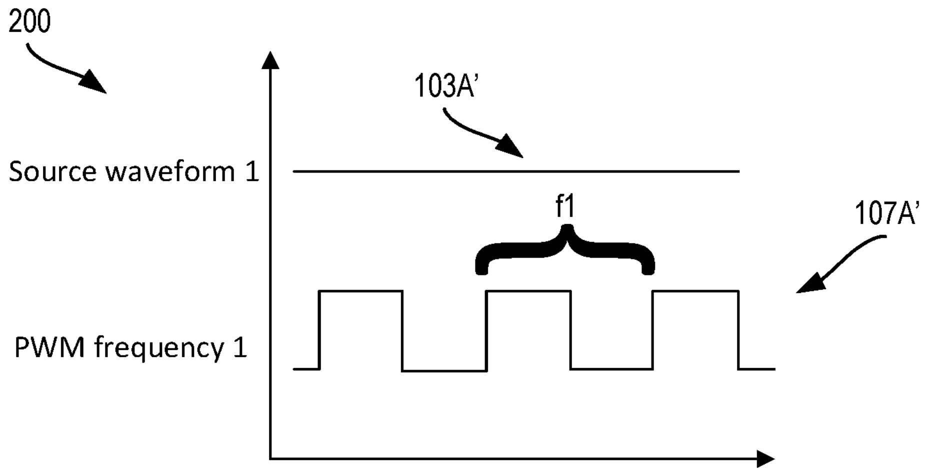
FIG. 2A illustrates example waveforms for a DC source current and a PWM signal according to one embodiment of the present disclosure.
Figure 2B:
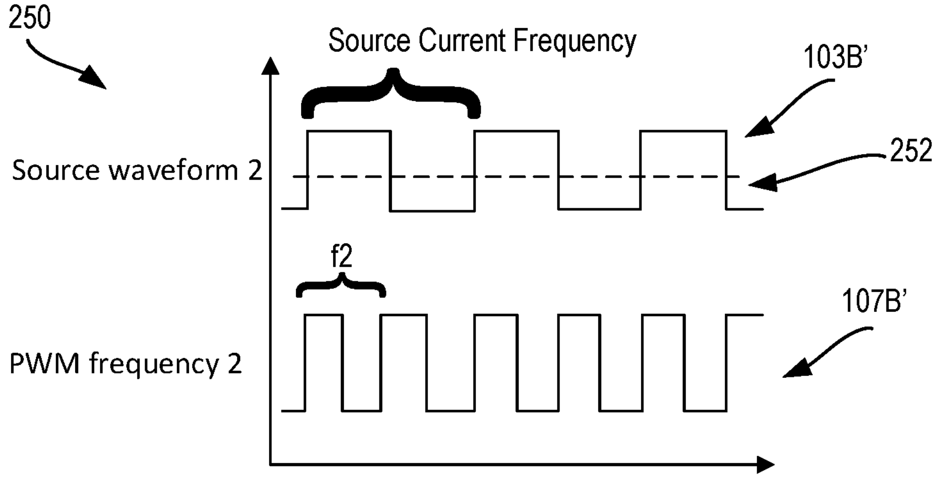
FIG. 2B illustrates example waveforms for a PWM source current and a PWM signal according to one embodiment of the present disclosure.

FIG. 2A illustrates example waveforms 200 for a DC source current 103A' and a PWM signal 107A' according to one embodiment of the present disclosure. The PWM signal 107A', as generated by the PWM frequency determination circuitry 104 and the PWM generation circuitry 106 described above, has a first frequency value, f1, based on the DC value of the DC source current 103A'. FIG. 2B illustrates example waveforms 250 for a PWM source current 103B' and a PWM signal 107B' according to one embodiment of the present disclosure. The PWM signal 107B', as generated by the PWM frequency determination circuitry 104 and the PWM generation circuitry 106 described above, has a second frequency value, f2, based on the frequency value of the source current. In this embodiment, the second frequency value, f2 is selected to be larger than the frequency value of the source current 103B', and is also selected to be larger than the first frequency value, f1. In this embodiment, the PWM source current 103B' may be a "hybrid" PWM source current having a DC offset value, noted at 252.

Figure 3A:
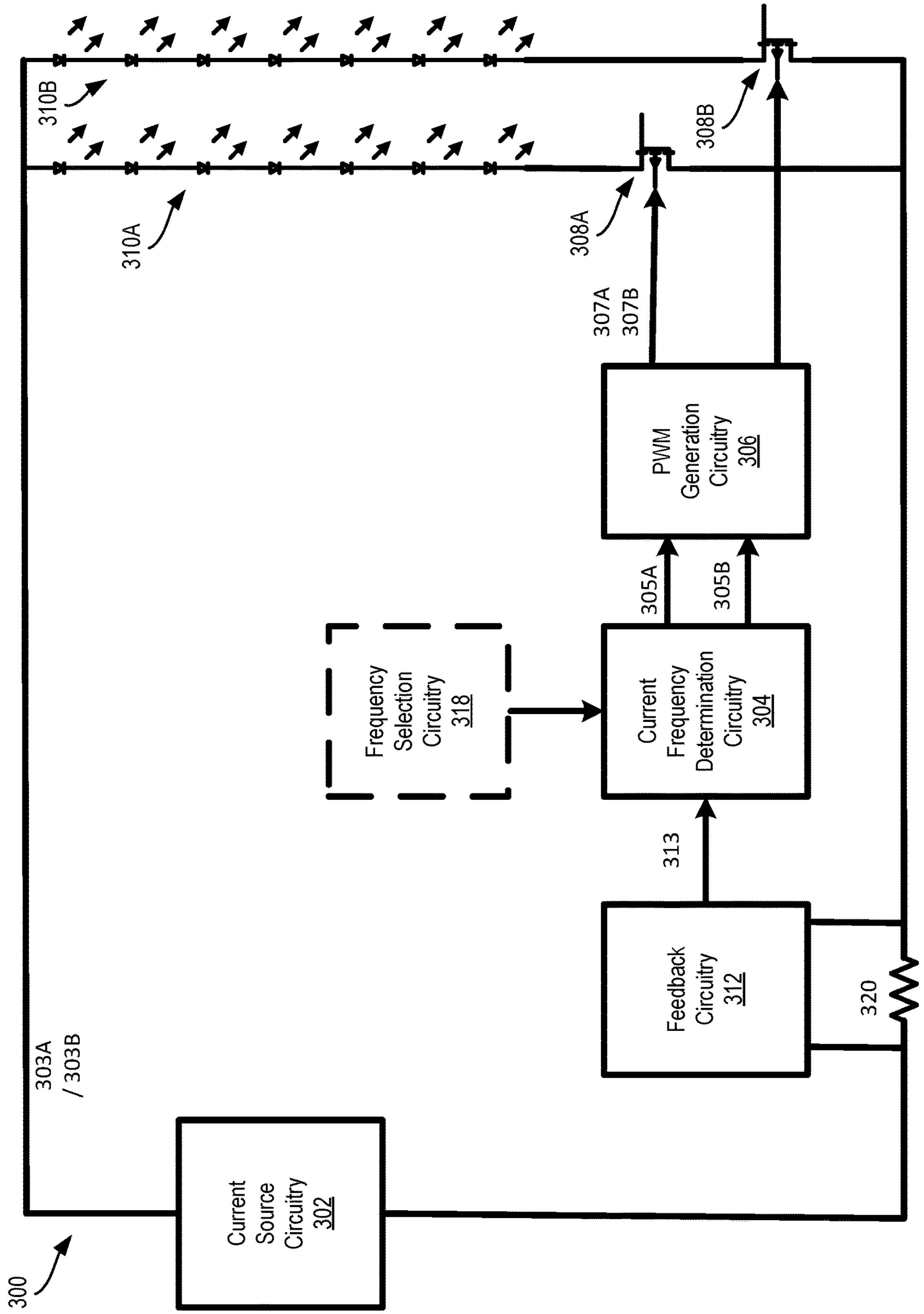
FIG. 3A illustrates an example dynamic PWM system according to one embodiment of the present disclosure.

FIG. 3A illustrates an example dynamic PWM system 300 according to one embodiment of the present disclosure. The dynamic PWM system 300 of this embodiment includes current source circuitry 302, current frequency determination circuitry 304, and PWM generation circuitry 306, as described above with reference to FIG. 1. This embodiment also includes a sense resistor 320 coupled to the output of the LED channels 310A and 310B. The feedback circuitry 312 is configured to determine the state of the source current using the sense resistor 320. Th control switches, in this embodiment, include a first transistor 308A and a second transistor 308B to control power delivered to respective LED channels 310A and 310B, using PWM signals 307A and 307B. For example, PWM signals 307A and/or 307B may be used to control switch 308A, and during OFF times of switch 308A (i.e., time periods when switch 308A is in a non-conducting state), the PWM generation circuitry may control switch 308B to be in an ON state, thus providing power to LED channel 310B. Of course, this is only an example, and in other embodiments switch 308B may be controlled by PWM signals 307A and/or 307B, and switch 308A is controlled to provide power to channel 310A during OFF times of switch 308B. In still other embodiments, the system 300 may include multiple channels 310A, . . . , 310*n* in which pairs of channels are controlled as described above (i.e., one channel is OFF while the other is ON and vice-versa. This embodiment may also include frequency selection circuitry 318 to provide programmable and/or user-selectable operating frequencies for the PWM signals.

Figure 3B:
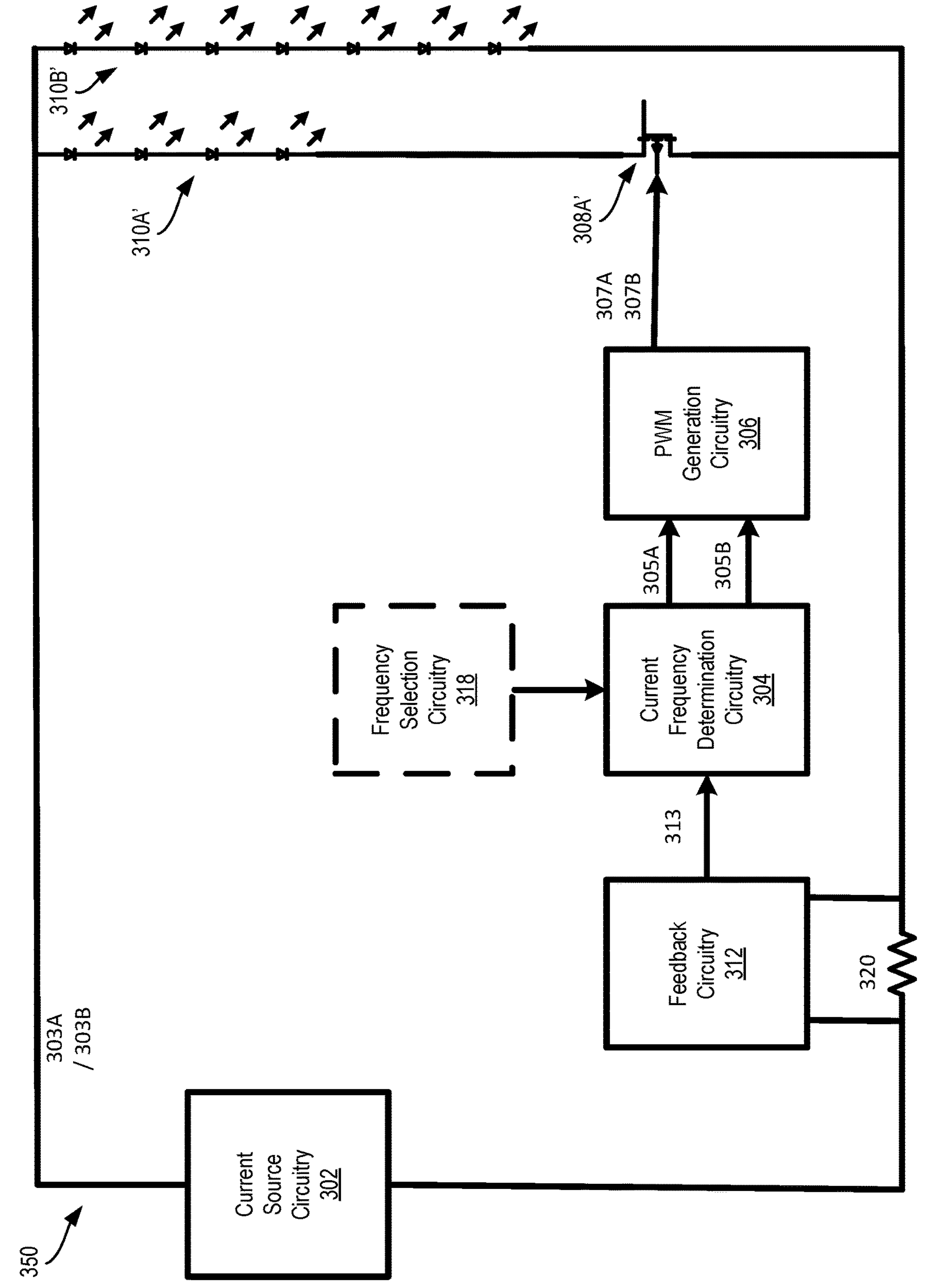
FIG. 3B illustrates an example dynamic PWM system according to another embodiment of the present disclosure.

FIG. 3B illustrates another example dynamic PWM system 350 according to one embodiment of the present disclosure. The dynamic PWM system 350 of this embodiment includes current source circuitry 302, current frequency determination circuitry 304, and PWM generation circuitry 306, as described above with reference to FIGS. 1 and 3A. This embodiment also includes a sense resistor 320 coupled to the output of the LED channels 310A' and 310B'. In this embodiment, channel 310A' includes fewer LED devices than than channel 310B', and thus channel 310A' may have an overall reduced impedance load compared to channel 310B'. The feedback circuitry 312 is configured to determine the state of the source current using the sense resistor 320. In this embodiment control switch 308A'is configured to control power delivered to respective LED channels 310A and 310B, using PWM signals 307A and 307B. For example, PWM signals 307A and/or 307B may be used to control switch 308A, and during OFF times of switch 308A' (i.e., time periods when switch 308A is in a non-conducting state), power is delivered to channel 310B'. Since channel 310A' has less impedance than channel 310B', when switch 308A' is in a conducting (ON) state, most of the power delivered by current source circuitry 302 will be delivered to channel 310A'.

Referring again to FIG. 1, and with continued reference to the examples of FIGS. 3A and 3B, in other embodiments the current frequency determination circuitry 104 may be configured to compare the feedback signal 113 to one or more threshold values (not shown) to determine the first control signal 105A and/or second control signal 105B. For example, a threshold value may be used such that if the feedback signal 113 has a value that is less than the threshold value, the current frequency determination circuitry 104 may generate the first control signal 105A, but if the feedback signal 113 has a value that is equal to or greater than the threshold signal the current frequency determination circuitry 104 may generate the second control signal 105B. In these examples, the threshold signal may have an amplitude and/or frequency value that is used to compare against the feedback signal 113.

Figure 4:
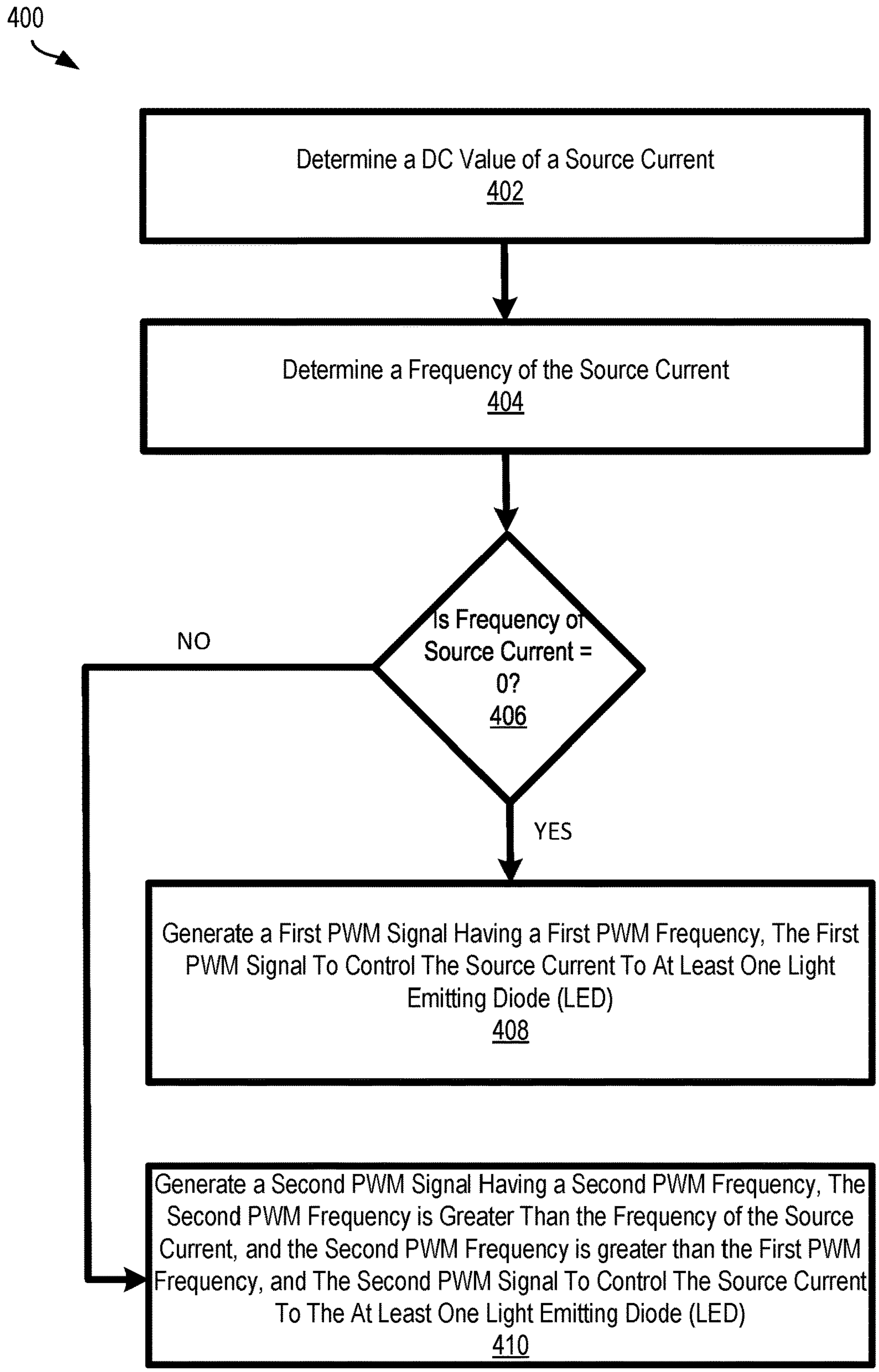
FIG. 4 illustrates a flowchart of operations according to one embodiment of the present disclosure.

FIG. 4 illustrates a flowchart 400 of operations according to one embodiment of the present disclosure. Operations of this embodiment include determining a DC value of a source current 402. Operations also include determining a frequency of the source current 404. Operations also include determining if the frequency of the source current is at or near zero (i.e., the source current is purely a DC current) 406. If the frequency of the source current is at or near zero, operations also include generating a first PWM signal having a first PWM frequency 408. The first PWM signal is used to control the source current to at least one light emitting diode (LED). If the frequency of the source current is greater than zero 406, operations of this embodiment also include generating a second PWM signal having a second PWM frequency 410. The send PWM frequency is selected to be greater than the frequency of the source current, and the second PWM frequency is greater than the first PWM frequency. The second PWM signal to control the source current to the at least one LED.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure. As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Any of the operations described herein may be implemented in a system that includes one or more non-transitory storage devices having stored therein, individually or in combination, instructions that when executed by circuitry perform the operations. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc. Thus, for example, the PWM frequency determination circuitry 104 and/or the PWM generation circuitry 106 may be embodied as one or more processors (e.g., ASIC, general-purpose processor, etc.) to execute code consistent with the operations described herein related to the PWM frequency determination circuitry 104 and/or the PWM generation circuitry 106.

The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Thus, in one embodiment the present disclosure provides a dynamic pulse width modulation (PWM) system that includes current frequency determination circuitry to determine a DC value of a source current, and to determine a frequency of the source current; and PWM generation circuitry to generate a first PWM signal having a first frequency based on the DC value of the source current; the PWM circuitry also to generate a second PWM signal having a second frequency based on the frequency of the source current; wherein the first frequency is less than the second frequency.

In another embodiment the present disclosure provides a method to generate pulse width modulation (PWM) signals to control power to at least one light emitting diode (LED), the method includes determining a DC value of a source current; determining a frequency of the source current; generating a first PWM signal having a first frequency based on the DC value of the source current; and generating a second PWM signal having a second frequency based on the frequency of the source current; wherein the first frequency is less than the second frequency.

In yet another embodiment, the present disclosure provides a non-transitory storage device that includes machine-readable instructions that, when executed by one or more processors, cause the one or more processors to perform operations including: determine a DC value of a source current; determine a frequency of the source current; generate a first PWM signal having a first frequency based on the DC value of the source current; and generate a second PWM signal having a second frequency based on the frequency of the source current; wherein the first frequency is less than the second frequency.

Reference throughout this specification to "one embodiment" or "an embodiment" means that a particular feature, structure, or characteristic described in connection with the embodiment is included in at least one embodiment, Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

What is claimed:

1. A dynamic pulse width modulation (PWM) system, comprising:

current frequency determination circuitry to determine at least one characteristic of the source current; the at least one characteristic of the source current includes a DC value of the source current and a frequency of the source current; and PWM generation circuitry to generate a first PWM signal having a first frequency based on the at least one characteristic of the source current; the PWM circuitry also to generate a second PWM signal having a second frequency based on at least one characteristic of the source current; wherein the first frequency is different than the second frequency.

2. The system of claim 1, further comprising:

control switch circuitry to receive the first and second PWM signal and control power delivered to at least one light emitting diode (LED) using the source current.

3. The system of claim 2, further comprising:

feedback circuitry coupled to the at least one LED; the feedback circuitry to generate a feedback signal indicative of, or proportional to, the DC value of the source current and the frequency value of the source current.

4. The system of claim 3, wherein the feedback circuitry comprises:

filter circuitry to filter the source current delivered to the at least one LED; and sampling circuitry to sample the source current delivered to the at least one LED.

5. The system of claim 2, wherein the control switch circuitry includes at least one transistor to be controlled by the first or second PWM signal.

6. The system of claim 1, wherein the second frequency is selected to be a multiple of the frequency of the source current.

7. The system of claim 6, wherein the second frequency is selected to be a whole number multiple of the frequency of the source current.

8. The system of claim 1, wherein the first frequency is based on the DC value of the source current.

9. The system of claim 1, wherein the second frequency is based on the frequency of the source current.

10. The system of claim 1, wherein the second frequency is based on a combination of the DC value of the source current and the frequency of the source current.

11. A method to generate pulse width modulation (PWM) signals to control power to at least one light emitting diode (LED), comprising:

determining a DC value of a source current;

determining a frequency of the source current;

generating a first PWM signal having a first frequency based on the DC value of the source current; and generating a second PWM signal having a second frequency based on the frequency of the source current; wherein the first frequency is less than the second frequency.

12. The method of claim 11, further comprising:

generating a feedback signal indicative of, or proportional to, the DC value of the source current and the frequency value of the source current delivered to at least one LED.

13. The method of claim 12, further comprising:

filtering the source current delivered to the at least one LED; and sampling the source current delivered to the at least one LED.

14. The method of claim 11, wherein the second frequency is selected to be a multiple of the frequency of the source current.

15. The method of claim 14, wherein the second frequency is selected to be a whole number multiple of the frequency of the source current.

16. A non-transitory storage device that includes machine-readable instructions that, when executed by one or more processors, cause the one or more processors to perform operations, comprising:

determine a DC value of a source current;

determine a frequency of the source current;

generate a first PWM signal having a first frequency based on the DC value of the source current; and generate a second PWM signal having a second frequency based on the frequency of the source current; wherein the first frequency is less than the second frequency.

17. The non-transitory storage device of claim 16, wherein the machine-readable instructions that, when executed by one or more processors, cause the one or more processors to perform operations, comprising:

generate a feedback signal indicative of, or proportional to, the DC value of the source current and the frequency value of the source current delivered to at least one LED.

18. The non-transitory storage device of claim 17, wherein the machine-readable instructions that, when executed by one or more processors, cause the one or more processors to perform operations, comprising:

filter the source current delivered to the at least one LED; and sample the source current delivered to the at least one LED.

19. The non-transitory storage device of claim 16, wherein the second frequency is selected to be a multiple of the frequency of the source current.

20. The non-transitory storage device of claim 19, wherein the second frequency is selected to be a whole number multiple of the frequency of the source current.

* * * * *